United States Patent
Agata et al.

(10) Patent No.: US 10,907,052 B2
(45) Date of Patent: Feb. 2, 2021

(54) POWDER COATING MATERIAL, COATED ITEM, AND METHOD FOR PRODUCING THE COATED ITEM

(71) Applicant: FUJI XEROX CO., LTD., Tokyo (JP)

(72) Inventors: Takeshi Agata, Kanagawa (JP); Susumu Yoshino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 134 days.

(21) Appl. No.: 15/947,872

(22) Filed: Apr. 9, 2018

(65) Prior Publication Data

US 2019/0055413 A1 Feb. 21, 2019

(30) Foreign Application Priority Data

Aug. 16, 2017 (JP) .................. 2017-157072

(51) Int. Cl.

| | | |
|---|---|---|
| *C09D 5/00* | (2006.01) | |
| *C09D 5/03* | (2006.01) | |
| *C09D 133/10* | (2006.01) | |
| *C09D 7/40* | (2018.01) | |
| *C08K 3/04* | (2006.01) | |
| *C08K 3/22* | (2006.01) | |
| *C08K 3/26* | (2006.01) | |
| *C08K 3/30* | (2006.01) | |
| *C08K 3/34* | (2006.01) | |
| *C08K 3/08* | (2006.01) | |
| *C08K 3/36* | (2006.01) | |
| *C08K 9/06* | (2006.01) | |

(52) U.S. Cl.

CPC ............. *C09D 5/031* (2013.01); *C09D 5/035* (2013.01); *C09D 7/67* (2018.01); *C09D 7/68* (2018.01); *C09D 133/10* (2013.01); *C08K 3/04* (2013.01); *C08K 3/22* (2013.01); *C08K 3/26* (2013.01); *C08K 3/30* (2013.01); *C08K 3/34* (2013.01); *C08K 3/36* (2013.01); *C08K 9/06* (2013.01); *C08K 2003/0856* (2013.01); *C08K 2003/2237* (2013.01); *C08K 2003/2248* (2013.01); *C08K 2003/2262* (2013.01); *C08K 2003/2275* (2013.01); *C08K 2003/2296* (2013.01); *C08K 2003/265* (2013.01); *C08K 2003/3045* (2013.01); *C08K 2201/005* (2013.01); *C08K 2201/013* (2013.01)

(58) Field of Classification Search

CPC ... C08K 3/04; C08K 3/22; C08K 3/26; C08K 3/30; C08K 3/34; C08K 3/36; C09D 5/031; C09D 5/035; C09D 7/67; C09D 7/68; C09D 133/10

See application file for complete search history.

(56) References Cited

FOREIGN PATENT DOCUMENTS

| JP | 2006-070082 | 3/2006 |
|---|---|---|
| JP | 4817002 | 11/2011 |
| JP | 2014-189687 | 10/2014 |

OTHER PUBLICATIONS

JP 2001-255692 machine translation. (Year: 2001).*

* cited by examiner

*Primary Examiner* — Edward J Cain
(74) *Attorney, Agent, or Firm* — JCIPRNET

(57) ABSTRACT

A powder coating material includes powder particles and an external additive including inorganic particles having an average primary particle diameter of 1000 nm or less. The ratio of the carbon content (mass %) in the inorganic particles to the average primary particle diameter (nm) of the inorganic particles is 0.1 or more. The powder coating material includes a black colorant or a white colorant or does not include any colorant.

19 Claims, No Drawings

POWDER COATING MATERIAL, COATED ITEM, AND METHOD FOR PRODUCING THE COATED ITEM

CROSS-REFERENCE TO RELATED APPLICATIONS

This application is based on and claims priority under 35 USC 119 from Japanese Patent Application No. 2017-157072 filed Aug. 16, 2017.

BACKGROUND

(i) Technical Field

The present invention relates to a powder coating material, a coated item, and a method for producing the coated item.

(ii) Related Art

A powder coating technique in which a powder coating material is used has been attracting attention from the viewpoint of protection of the global environment, because the technique reduces the amount of volatile organic compound (VOC) emitted in a coating process and enables particles of the powder coating material which do not adhere to an item that is to be coated to be recovered and reused after the item has been coated with the powder coating material. Accordingly, various powder coating materials have been studied.

There has been attempt to control the matt level (i.e., the gloss level) of a black, white, or transparent coating film formed using a powder coating material. However, a coating film formed using a powder coating material that includes an internal additive, such as a matting agent, added to the powder particles is likely to have a granular texture rather than a smooth texture. On the other hand, if an internal additive, such as a matting agent, is not added to the powder particles, a coating film having a controlled matt level may fail to be formed, because it is difficult to reduce the gloss level of a coating film without using the internal additive.

SUMMARY

According to an aspect of the invention, there is provided a powder coating material including powder particles and an external additive including inorganic particles having an average primary particle diameter of 1000 nm or less, a ratio of the carbon content (mass %) in the inorganic particles to the average primary particle diameter (nm) of the inorganic particles being 0.1 or more, wherein the powder coating material includes a black colorant or a white colorant or does not include any colorant.

DETAILED DESCRIPTION

Exemplary embodiments of the invention are described in detail below.
Powder Coating Material
The powder coating material according to an exemplary embodiment is a black, white, or transparent powder coating material that includes powder particles and an external additive. The external additive includes inorganic particles having an average primary particle diameter of 1000 nm or less. The ratio of the carbon content (mass %) in the inorganic particles to the average primary particle diameter (nm) of the inorganic particles is 0.1 or more.

There has been attempt to control the matt level (i.e., the gloss level) of a black, white, or transparent coating film formed using a powder coating material. The matt level of such a coating film has been controlled by adding an internal additive, such as a matting agent, to the powder particles and thereby controlling inconsistencies in the melt viscosity of the powder particles in the formation of the coating film.

However, adding an internal additive, such as a matting agent, to the powder particles in order to control the matt level of a coating film may form large irregularities in the surface of the coating film, which degrade the smoothness of the surface of the coating film. Accordingly, the higher the matt level of the coating film (i.e., the lower the gloss level of the coating film), the higher the granularity of the surface of the coating film (i.e., the lower the degree of smoothness of the coating film).

On the other hand, if an internal additive, such as a matting agent, is not added to the powder particles, a coating film having a controlled matt level may fail to be formed, because it is difficult to reduce the gloss level of the coating film without using the internal additive.

In contrast, the above-described powder coating material according to an exemplary embodiment enables a black, white, or transparent coating film having a smooth texture and a controlled matt level to be readily formed. The reasons for this are not clear but presumably as follows.

When the inorganic particles having an average primary particle diameter of 1000 nm or less, the ratio of the carbon content (mass %) in the inorganic particles to the average primary particle diameter (nm) of the inorganic particles being 0.1 or more, are used as an external additive and deposited on the surfaces of the powder particles, fine irregularities are formed in the surface of the coating film. It is considered that the fine irregularities present in the surface of the coating film reduce the gloss level of the coating film. Furthermore, the above-described inorganic particles are capable of reducing the gloss level of the coating film by a larger degree, relative to the amount of inorganic particles deposited on the surfaces of the powder particles, than inorganic particles having an average primary particle diameter of 1000 nm or less, the ratio of the carbon content (mass %) in the inorganic particles to the average primary particle diameter (nm) of the inorganic particles being less than 0.1.

In addition, the likelihood of formation of large irregularities in the surface of the coating film is small, and fine irregularities are formed instead. This limits the degradation of surface smoothness of the coating film and provides the coating film with a smooth texture.

It is considered that, for the above reasons, the powder coating material according to an exemplary embodiment enable a black, white, or transparent coating film having a smooth texture and a controlled matt level to be readily formed.

Furthermore, the powder coating material according to an exemplary embodiment is capable of forming a coating film having a certain degree of surface smoothness while having a low gloss level. Therefore, a coating film formed using the powder coating material according to an exemplary embodiment has specular reflectivity although the gloss level of the coating film is low (i.e., the matt level of the coating film is high). This increases, for example, the likelihood of a light source, such as a fluorescent lamp, being reflected on the surface of the coating film and makes it easy to maintain the quality and beautiful appearance of the coating film.

In the powder coating material according to an exemplary embodiment, the small-diameter inorganic particles having an average primary particle diameter of 1000 nm or less are used as external additive and deposited on the surfaces of the powder particles. This may increase the likelihood of formation of a coating film having a highly uniform thickness and a high strength compared with the case where only inorganic particles having large diameters are deposited on the surfaces of the powder particles.

In the case where the matt level of a coating film is controlled by adding an internal additive, such as a matting agent, to the powder particles, it is necessary to change the composition of the powder particles in accordance with the desired matt level of the coating film and produce powder particles having the composition.

In contrast, when the powder coating material according to an exemplary embodiment is used, the matt level of the coating film can be controlled by changing the type and the amount of the external additive deposited on the surfaces of the powder particles. Specifically, the control of the matt level of the coating film may be achieved by changing the type and the amount of the external additive deposited on the surfaces of the powder particles even when powder particles having the same composition and properties are used.

Accordingly, the powder coating material according to an exemplary embodiment enables a coating film having a controlled matt level to be formed in a simple and easy manner at low costs by using powder particles having the same composition and properties and changing the type and the amount of the external additive deposited on the surfaces of the powder particles in accordance with the desired matt level of the coating film.

The structure of the powder coating material according to an exemplary embodiment is described below in detail.

External Additive

The external additive includes inorganic particles having an average primary particle diameter of 1000 nm or less. The ratio of the carbon content (mass %) in the inorganic particles to the average primary particle diameter (nm) of the inorganic particles, that is, [Carbon content]/[Average primary particle diameter], is 0.1 or more (hereinafter, the above inorganic particles are referred to as "specific inorganic particles").

The ratio of the carbon content (mass %) in the specific inorganic particles to the average primary particle diameter (nm) of the specific inorganic particles is preferably 0.1 or more and 8.0 or less and is more preferably 0.3 or more and 6.0 or less in order to provide the coating film with a smooth texture and control the matt level of the coating film.

The average primary particle diameter of the specific inorganic particles is preferably 10 nm or more and 500 nm or less, is more preferably 10 nm or more and 100 nm or less, is further preferably 10 nm or more and 90 nm or less, is particularly preferably 10 nm or more and 70 nm or less, and is most preferably 15 nm or more and 60 nm or less in order to provide the coating film with a smooth texture and control the matt level of the coating film.

Setting the average primary particle diameter of the specific inorganic particles to fall within the above range also increases the likelihood of formation of a coating film having a uniform thickness and a high strength.

The average primary particle diameter of the specific inorganic particles is measured by the following method.

The powder coating material that is to be measured is observed with a scanning electron microscope (SEM). The equivalent circle diameters of 100 specific inorganic particles that are to be measured are determined by image analysis. The distribution of the equivalent circle diameters of the inorganic particles is calculated with respect to cumulative volume in ascending order in terms of particle diameter. An equivalent circle diameter at which the cumulative volume reaches 50% is considered to be the average primary particle diameter of the specific inorganic particles.

The image analysis for determining the equivalent circle diameters of the 100 specific inorganic particles that are to be measured is conducted by capturing a two-dimensional image of the inorganic particles with an analyzer "ERA-8900" produced by Elionix Inc. at a 10,000-fold magnification, measuring the projected areas of the inorganic particles using image analysis software "WinROOF" produced by MITANI Corporation under the condition of 0.010000 µm/pixel, and calculating the equivalent circle diameters of the inorganic particles using the following formula.

$$\text{Equivalent circle diameter} = 2 \times (\text{Projected area}/\pi)^{1/2}$$

When the powder coating material includes plural types of specific inorganic particles, it is necessary to distinguish the plural types of inorganic particles from one another for measuring the average primary particle diameter of each of the plural types of specific inorganic particles. Specifically, plural types of specific inorganic particles can be distinguished from one another by associating each of the elements originating from the plural types of specific inorganic particles with the corresponding one of the types of the specific inorganic particles by performing element mapping with a scanning electron microscope provided with an energy-dispersive X-ray analyzer (SEM-EDX).

The carbon content in the specific inorganic particles is preferably 0.1% by mass or more and 8.0% by mass or less and is more preferably 0.3% by mass or more and 6.0% by mass or less of the total amount of the specific inorganic particles in order to provide the coating film with a smooth texture and control the matt level of the coating film.

The carbon content in the specific inorganic particles may be the content of carbon resulting from a surface-treating agent. The carbon content in the specific inorganic particles may be adjusted by changing the amount of the surface-treating agent used.

The carbon content in the specific inorganic particles is determined by firing the inorganic particles in an element analyzer and measuring the carbon content in the fired inorganic particles. The carbon content in the specific inorganic particles may alternatively be determined nondestructively by using fluorescent x-rays.

Examples of the specific inorganic particles include particles containing $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, or $MgSO_4$.

The above types of specific inorganic particles may be used alone or in combination of two or more.

The specific inorganic particles may be inorganic oxide particles in order to provide the coating film with a smooth texture and control the matt level of the coating film. Among inorganic oxide particles, at least one selected from the group consisting of silicon oxide particles (i.e., silica particles), titanium oxide particles, and zinc oxide particles is preferably used, and silicon oxide particles (i.e., silica particles) are more preferably used.

The surfaces of the specific inorganic particles may be treated with a surface-treating agent.

Examples of the surface-treating agent include a silane coupling agent, a titanate coupling agent, an aluminate coupling agent, and a silicone oil.

Among the above surface-treating agents, in particular, at least one selected from the group consisting of a silane coupling agent, a titanate coupling agent, and a silicone oil may be used.

Examples of the silane coupling agent include hexamethyldisilazane, trimethylsilane, trimethylchlorosilane, dimethyldichlorosilane, methyltrichlorosilane, allyldimethylchlorosilane, benzyldimethylchlorosilane, methyltrimethoxysilane, methyltriethoxysilane, isobutyltrimethoxysilane, dimethyldimethoxysilane, dimethyldiethoxysilane, trimethylmethoxysilane, hydroxypropyltrimethoxysilane, phenyltrimethoxysilane, n-butyltrimethoxysilane, n-hexadecyltrimethoxysilane, n-octadecyltrimethoxysilane, vinyltrimethoxysilane, vinyltriethoxysilane, γ-methacryloxypropyltrimethoxysilane, and vinyltriacetoxysilane.

Among the above silane coupling agents, in particular, a silane coupling agent including at least one selected from an alkyl group, a chloro group, and an amino group may be used.

Examples of the titanate coupling agent include isopropyl tri(N-aminoethylaminoethyl) titanate, isopropyl triisostearoyl titanate, diisopropyl bis(dioctylphosphate) titanate, tetraisopropyl bis(dioctylphosphite) titanate, tetraoctyl bis(ditridecylphosphite) titanate, tetra(2,2-diallyloxymethyl-1-butyl) bis(ditridecylphosphite) titanate, bis(dioctylpyrophosphate)ethylene titanate, and bis(dioctylpyrophosphate) oxyacetate titanate.

Among the above titanate coupling agents, in particular, a titanate coupling agent including an alkyl group may be used.

Examples of the silicone oil include dialkylpolysiloxane (e.g., dimethylpolysiloxane, diethylpolysiloxane, or dipropylpolysiloxane); phenyl-modified polysiloxane produced by replacing a part of the side chains of dialkylpolysiloxane with a phenyl group; and fluoroalkyl-modified polysiloxane produced by replacing a part of the side chains of dialkylpolysiloxane with a fluoroalkyl group. Examples of the silicone oil include polyether-modified polysiloxane, alcohol-modified polysiloxane, amino-modified polysiloxane, epoxy-modified polysiloxane, epoxy-and-polyether-modified polysiloxane, phenol-modified polysiloxane, carboxyl-modified polysiloxane, mercapto-modified polysiloxane, acrylic-modified polysiloxane, methacrylic-modified polysiloxane, and α-methylstyrene-modified polysiloxane.

The above surface-treating agents may be used alone or in combination of two or more.

The amount of the surface-treating agent used, that is, the proportion of the amount of the surface-treating agent to the amount of specific inorganic particles that are to be treated, is determined such that the ratio of the above carbon content (mass %) to the above average primary particle diameter (nm) falls within the above range. The amount of the surface-treating agent used may be set to, for example, 0.1% by mass or more and 8.0% by mass or less and is preferably set to 0.3% by mass or more and 6.0% by mass or less.

The amount of the surface-treating agent used is determined by heating the inorganic particles at 30° C. or more and 1000° C. or less with a differential thermal analyzer (e.g., "TG8120" produced by Rigaku Corporation) in a nitrogen atmosphere and measuring a reduction in the mass of the inorganic particles which occurs during the heating.

The coverage of the specific inorganic particles, that is, the coverage at which the surfaces of the powder particles are covered with the specific inorganic particles, is determined in accordance with the desired matt level of the coating film. The coverage of the specific inorganic particles may be set to, for example, 20% or more and 120% or less and is preferably 40% or more and 100% or less.

The coverage of the specific inorganic particles is determined by the following method.

For each sample, ten images of the surfaces of the powder particles are captured with an ultra-high-resolution field-emission scanning electron microscope (FE-SEM) "SU8040" produced by Hitachi High-Technologies Corporation at a 100,000-fold magnification. In each of the images, a region that includes the surfaces of the powder particles and a region that includes the external additive are separated by color by performing binarizing process using image analysis software "WinROOF" produced by MITANI Corporation. The coverage of the specific inorganic particles is determined on the basis of the area ratio between the two regions.

The specific inorganic particles may be used in combination with known external additives other than the specific inorganic particles.

Powder Particles

The powder particles include, for example, a thermosetting resin and a thermosetting agent. The powder particles may optionally include a colorant, a metal ion having a valence of two or more, and other additives.

The powder coating material according to an exemplary embodiment is a black, white, or transparent powder coating material. In the case where the powder coating material according to an exemplary embodiment is a black powder coating material, the powder particles include a black colorant. In the case where the powder coating material according to an exemplary embodiment is a white powder coating material, the powder particles include a white colorant. In the case where the powder coating material according to an exemplary embodiment is a transparent powder coating material, the powder particles do not include any colorant or, even when the powder particles include a colorant, the amount of the colorant is 0.01% by mass or less of the total amount of the powder particles.

Thermosetting Resin

The thermosetting resin is a resin including a thermosetting group. Examples of the thermosetting resin include various resins that have been used as a component of powder particles included in a powder coating material.

The thermosetting resin may be a water-insoluble (i.e., hydrophobic) resin. Using a water-insoluble (i.e., hydrophobic) resin as a thermosetting resin may reduce the environment dependence of the charging characteristics of the powder coating material (i.e., the powder particles). In the case where the powder particles are prepared by an aggregation-coalescence method, a water-insoluble (i.e., hydrophobic) resin may be used as a thermosetting resin in order to perform emulsification and dispersion in an aqueous medium. The term "water-insoluble (i.e., hydrophobic)" used herein refers to a substance having a solubility such that the amount of substance that dissolves in 100 parts by mass of water at 25° C. is less than 5 parts by mass.

The thermosetting resin is, for example, at least one selected from the group consisting of a thermosetting polyester resin, a thermosetting (meth)acrylic resin, a thermosetting fluororesin (e.g., a fluoroethylene-vinyl ether (FEVE) copolymer resin), and a thermosetting polyethylene resin. Among the above thermosetting resins, in particular, a thermosetting polyester resin may be used in order to, for example, readily control the triboelectric series during coating, increase the strength of the coating film, and provide the coating film with a beautiful finish.

Thermosetting Polyester Resin

The thermosetting polyester resin is a polyester resin including a thermosetting group. Examples of the thermosetting group included in the thermosetting polyester resin include an epoxy group, a carboxyl group, a hydroxyl group, an amide group, an amino group, an acid anhydride group, and a blocked isocyanate group. Among the above thermosetting groups, in particular, a carboxyl group or a hydroxyl group may be used in order to facilitate the synthesis of the thermosetting resin.

The thermosetting polyester resin is, for example, a polycondensate produced by the polycondensation of at least a polybasic acid with a polyhydric alcohol.

The thermosetting group is introduced to the thermosetting polyester resin by adjusting the amounts of the polybasic acid and the polyhydric alcohol used in the synthesis of the polyester resin. The above adjustment enables the production of a thermosetting polyester resin including at least one thermosetting group selected from a carboxyl group and a hydroxyl group.

The thermosetting polyester resin may be produced by introducing the thermosetting group to a polyester resin subsequent to the formation of the polyester resin.

Examples of the polybasic acid include terephthalic acid, isophthalic acid, phthalic acid, methylterephthalic acid, trimellitic acid, pyromellitic acid, and anhydrides of the above acids; succinic acid, adipic acid, azelaic acid, sebacic acid, and anhydrides of the above acids; maleic acid, itaconic acid, and anhydrides of the above acids; fumaric acid, tetrahydrophthalic acid, methyltetrahydrophthalic acid, hexahydrophthalic acid, methylhexahydrophthalic acid, and anhydrides of the above acids; and cyclohexanedicarboxylic acid and 2,6-naphthalenedicarboxylic acid.

Examples of the polyhydric alcohol include ethylene glycol, diethylene glycol, propylene glycol, dipropylene glycol, 1,3-butanediol, 1,4-butanediol, 1,5-pentanediol, 1,6-hexanediol, neopentyl glycol, triethylene glycol, bis-(hydroxyethyl)terephthalate, cyclohexanedimethanol, octanediol, diethylpropanediol, butylethylpropanediol, 2-methyl-1,3-propanediol, 2,2,4-trimethylpentanediol, hydrogenated bisphenol A, an ethylene oxide adduct of hydrogenated bisphenol A, a propylene oxide adduct of hydrogenated bisphenol A, trimethylolethane, trimethylolpropane, glycerin, pentaerythritol, trishydroxyethylisocyanurate, and hydroxypivalyl hydroxypivalate.

The thermosetting polyester resin may be produced by the polycondensation of monomers other than a polybasic acid or a polyhydric alcohol.

Examples of the other monomers include a compound that includes a carboxyl group and a hydroxyl group in one molecule, such as dimethanolpropionic acid or hydroxypivalate; a monoepoxy compound, such as a glycidyl ester of a branched aliphatic carboxylic acid (e.g., "Cardura E10" produced by Shell Chemicals); monohydric alcohols, such as methanol, propanol, butanol, and benzyl alcohol; monobasic acids, such as benzoic acid and p-tert-butylbenzoic acid); and fatty acids, such as castor oil fatty acid, coconut oil fatty acid, and soybean oil fatty acid.

The structure of the thermosetting polyester resin may be either branched or linear.

The thermosetting polyester resin may be a polyester resin such that the total of the acid value and the hydroxyl value of the polyester resin is 10 mgKOH/g or more and 250 mgKOH/g or less and the number-average molecular weight of the polyester resin is 1000 or more and 100,000 or less.

Setting the total of the acid value and the hydroxyl value of the thermosetting polyester resin to fall within the above range may enhance the smoothness and mechanical properties of the coating film. Setting the number-average molecular weight of the thermosetting polyester resin to fall within the above range may enhance the smoothness and mechanical properties of the coating film and the storage stability of the powder coating material.

The acid value and hydroxyl value of the thermosetting polyester resin are measured in accordance with JIS K-0070-1992. The number-average molecular weight of the thermosetting polyester resin is measured as in the measurement of the number-average molecular weight of the thermosetting (meth)acrylic resin described below.

Thermosetting (Meth)Acrylic Resin

The thermosetting (meth)acrylic resin is a (meth)acrylic resin that includes a thermosetting group. A thermosetting group may be introduced to the thermosetting (meth)acrylic resin by using a vinyl monomer that includes a thermosetting group. The vinyl monomer that includes a thermosetting group may be either a (meth)acrylic monomer (i.e., a monomer including a (meth)acryloyl group) or a vinyl monomer other than a (meth)acrylic monomer.

Examples of the thermosetting group included in the thermosetting (meth)acrylic resin include an epoxy group, a carboxyl group, a hydroxyl group, an amide group, an amino group, an acid anhydride group, and a (blocked) isocyanate group. Among the above thermosetting groups of the (meth) acrylic resin, at least one selected from the groups consisting of an epoxy group, a carboxyl group, and a hydroxyl group is preferably used in order to facilitate the production of the (meth)acrylic resin. It is more preferable that at least one thermosetting group be an epoxy group in order to enhance the storage stability of the powder coating material and the appearance of the coating film.

Examples of a vinyl monomer including an epoxy group that serves as a thermosetting group include chain epoxy group-containing monomers, such as glycidyl (meth)acrylate, β-methylglycidyl (meth)acrylate, glycidyl vinyl ether, and allyl glycidyl ether); (2-oxo-1,3-oxolane) group-containing vinyl monomers, such as (2-oxo-1,3-oxolane)methyl (meth)acrylate; and alicyclic epoxy group-containing vinyl monomers, such as 3,4-epoxycyclohexyl (meth)acrylate, 3,4-epoxycyclohexylmethyl (meth)acrylate, and 3,4-epoxycyclohexylethyl (meth)acrylate.

Examples of a vinyl monomer including a carboxyl group that serves as a thermosetting group include carboxyl group-containing monomers, such as (meth)acrylic acid, crotonic acid, itaconic acid, maleic acid, and fumaric acid; monoesters of an α,β-unsaturated dicarboxylic acid and a monohydric alcohol including 1 to 18 carbon atoms, such as monomethyl fumarate, monoethyl fumarate, monobutyl fumarate, monoisobutyl fumarate, mono-tert-butyl fumarate, monohexyl fumarate, monooctyl fumarate, mono-2-ethylhexyl fumarate, monomethyl maleate, monoethyl maleate, monobutyl maleate, monoisobutyl maleate, mono-tert-butyl maleate, monohexyl maleate, monooctyl maleate, and mono-2-ethylhexyl maleate); and monoalkyl esters of itaconic acid, such as monomethyl itaconate, monoethyl itaconate, monobutyl itaconate, monoisobutyl itaconate, monohexyl itaconate, monooctyl itaconate, and mono-2-ethylhexyl itaconate).

Examples of a vinyl monomer including a hydroxyl group that serves as a thermosetting group include hydroxyl group-containing (meth)acrylates, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, polyethylene glycol mono(meth)acrylate, and polypropylene glycol mono(meth)acrylate; products of addition reaction of the above hydroxyl group-containing (meth)acrylates with ε-caprolactone; hydroxyl group-containing vinyl ethers, such as 2-hydroxyethyl vinyl ether, 3-hydroxypropyl vinyl ether, 2-hydroxypropyl vinyl ether, 4-hydroxybutyl vinyl ether, 3-hydroxybutyl vinyl ether, 2-hydroxy-2-methylpropyl vinyl ether, 5-hydroxypentyl vinyl ether, and 6-hydroxyhexyl vinyl ether; products of addition reaction of the above hydroxyl group-containing vinyl ethers with ε-caprolactone; hydroxyl group-containing allyl ethers, such as 2-hydroxyethyl (meth)allyl ether, 3-hydroxypropyl (meth)allyl ether, 2-hydroxypropyl (meth)allyl ether, 4-hydroxybutyl (meth) allyl ether, 3-hydroxybutyl (meth)allyl ether, 2-hydroxy-2-methylpropyl (meth)allyl ether, 5-hydroxypentyl (meth)allyl ether, and 6-hydroxyhexyl (meth)allyl ether; and products of addition reaction of the above hydroxyl group-containing allyl ethers with ε-caprolactone.

The thermosetting (meth)acrylic resin may be produced by the copolymerization of the above (meth)acrylic monomer with another vinyl monomer that does not include a thermosetting group.

Examples of the other vinyl monomer include α-olefins, such as ethylene, propylene, and butene-1; halogenated olefins other than fluoroolefins, such as vinyl chloride and vinylidene chloride; aromatic vinyl monomers, such as styrene, α-methylstyrene, and vinyltoluene; diesters of an unsaturated dicarboxylic acid and a monohydric alcohol including 1 to 18 carbon atoms, such as dimethyl fumarate, diethyl fumarate, dibutyl fumarate, dioctyl fumarate, dimethyl maleate, diethyl maleate, dibutyl maleate, dioctyl maleate, dimethyl itaconate, diethyl itaconate, dibutyl itaconate, and dioctyl itaconate); acid anhydride group-containing monomers, such as maleic anhydride, itaconic anhydride, citraconic anhydride, (meth)acrylic anhydride, and tetrahydrophthalic anhydride; phosphoric acid ester group-containing monomers, such as diethyl-2-(meth)acryloyloxyethyl phosphate, dibutyl-2-(meth)acryloyloxybutyl phosphate, dioctyl-2-(meth)acryloyloxyethyl phosphate, and diphenyl-2-(meth)acryloyloxyethyl phosphate; hydrolyzable silyl group-containing monomers, such as γ-(meth)acryloyloxypropyltrimethoxysilane, γ-(meth)acryloyloxypropyltriethoxysilane, and γ-(meth)acryloyloxypropylmethyldimethoxysilane; aliphatic vinyl carboxylates, such as vinyl acetate, vinyl propionate, vinyl butyrate, vinyl isobutyrate, vinyl caproate, vinyl caprylate, vinyl caprate, vinyl laurate, branched aliphatic vinyl carboxylate including 9 to 11 carbon atoms, and vinyl stearate; and vinyl esters of a carboxylic acid having a ring structure, such as vinyl cyclohexanecarboxylate, vinyl methylcyclohexanecarboxylate, vinyl benzoate, and vinyl p-tert-butylbenzoate.

In the case where a vinyl monomer other than a (meth) acrylic monomer is used as a vinyl monomer including a thermosetting group in the production of the thermosetting (meth)acrylic resin, an acrylic monomer that does not include a curable group is used.

Examples of the acrylic monomer that does not include a curable group include alkyl esters of (meth)acrylic acid, such as methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, n-hexyl (meth)acrylate, cyclohexyl (meth)acrylate, 2-ethylhexyl (meth)acrylate, n-octyl (meth)acrylate, isooctyl (meth)acrylate, 2-ethyloctyl (meth)acrylate, dodecyl (meth) acrylate, isodecyl (meth)acrylate, lauryl (meth)acrylate, and stearyl (meth)acrylate; aryl esters of (meth)acrylic acid, such as benzyl (meth)acrylate, phenyl (meth)acrylate, and phenoxyethyl (meth)acrylate; alkyl carbitol (meth)acrylates, such as ethyl carbitol (meth)acrylate; other (meth)acrylic acid esters, such as isobornyl (meth)acrylate, dicyclopentanyl (meth)acrylate, dicyclopentenyl (meth)acrylate, dicyclopentenyloxyethyl (meth)acrylate, and tetrahydrofurfuryl (meth)acrylate; amino group-containing amide unsaturated monomers, such as N-dimethylaminoethyl(meth)acrylamide, N-diethylaminoethyl(meth)acrylamide, N-dimethylaminopropyl(meth)acrylamide, and N-diethylaminopropyl (meth)acrylamide; dialkylaminoalkyl (meth)acrylates, such as dimethylaminoethyl (meth)acrylate and diethylaminoethyl (meth)acrylate; and amino group-containing monomers, such as tert-butylaminoethyl (meth)acrylate, tert-butylaminopropyl (meth)acrylate, aziridinylethyl (meth)acrylate, pyrrolidinylethyl (meth)acrylate, and piperidinylethyl (meth)acrylate.

The thermosetting (meth)acrylic resin may be an acrylic resin having a number-average molecular weight of 1,000 or more and 20,000 or less (preferably 1,500 or more and 15,000 or less).

Setting the number-average molecular weight of the acrylic resin to fall within the above range may enhance the smoothness and mechanical properties of the coating film.

The weight-average molecular weight and number-average molecular weight of the thermosetting (meth)acrylic resin are determined by gel permeation chromatography (GPC). Specifically, the molecular weights of the thermosetting (meth)acrylic resin are determined by GPC using a GPC system "HLC-8120GPC" produced by Tosoh Corporation, columns "TSKgel SuperHM-M (15 cm)" produced by Tosoh Corporation, and a tetrahydrofuran (THF) solvent. The weight-average molecular weight and number-average molecular weight of the thermosetting (meth)acrylic resin are determined on the basis of the results of the GPC analysis using a molecular-weight calibration curve based on monodisperse polystyrene standard samples.

The above thermosetting resins may be used alone or in combination of two or more.

The amount of thermosetting resin is preferably 20% by mass or more and 99% by mass or less and is more preferably 30% by mass or more and 95% by mass or less of the total amount of powder particles.

In the case where the powder particles are the core-shell particles described below and the thermosetting resin is used as a resin constituting the resin shells, the term "amount of thermosetting resin" refers to the total amount of the thermosetting resin included in the cores and resin shells.

Thermosetting Agent

The thermosetting agent is selected in accordance with the type of the thermosetting group included in the thermosetting resin.

The term "thermosetting agent" used herein refers to a compound including a functional group capable of reacting with the thermosetting group of the thermosetting resin, which serves as a terminal group of the thermosetting resin.

In the case where the thermosetting group of the thermosetting resin is a carboxyl group, examples of the thermosetting agent include epoxy resins, such as a polyglycidyl ether of bisphenol A; epoxy group-containing acrylic resins, such as glycidyl group-containing acrylic resin; polyglycidyl ethers of a polyhydric alcohol, such as 1,6-hexanediol, trimethylolpropane, or trimethylolethane; polyglycidyl esters of a polyvalent carboxylic acid, such as phthalic acid, terephthalic acid, isophthalic acid, hexahydrophthalic acid, methylhexahydrophthalic acid, trimellitic acid, or pyromellitic acid; alicyclic epoxy group-containing compounds, such as bis(3,4-epoxycyclohexyl)methyl adipate; and hydroxyamides, such as triglycidyl isocyanurate and β-hydroxyalkylamide.

In the case where the thermosetting group of the thermosetting resin is a hydroxyl group, examples of the thermosetting agent include polyblocked isocyanates and aminoplast resins. Examples of the polyblocked polyisocyanates include the following organic diisocyanates: aliphatic diisocyanates, such as hexamethylene diisocyanate and trimethylhexamethylene diisocyanate; alicyclic diisocyanates, such as xylylene diisocyanate and isophorone diisocyanate; and aromatic diisocyanates, such as tolylene diisocyanate and 4,4'-diphenylmethane diisocyanate. Examples of the polyblocked polyisocyanates further include adducts of the above organic diisocyanates with a polyhydric alcohol, a low-molecular polyester resin (e.g., polyester polyol), water, or the like; homopolymers of the above organic diisocyanates, such as isocyanurate polyisocyanates; blocked polyisocyanates produced by blocking a polyisocyanate, such as an isocyanurate polyisocyanate or a biuret polyisocyanate with a known blocking agent; and self-blocked polyisocyanates having a structural unit including a uretdione bond.

In the case where the thermosetting group of the thermosetting resin is an epoxy group, examples of the thermosetting agent include succinic acid, glutaric acid, adipic acid, pimelic acid, suberic acid, azelaic acid, sebacic acid, dodecanedioic acid, eicosanedioic acid, maleic acid, citraconic acid, itaconic acid, glutaconic acid, phthalic acid, trimellitic acid, pyromellitic acid, tetrahydrophthalic acid, hexahydrophthalic acid, cyclohexene-1,2-dicarboxylic acid, trimellitic acid, and pyromellitic acid; anhydrides of the above acids; and urethane-modified products of the above acids. Among the above thermosetting agents, an aliphatic dibasic acid is preferably used in consideration of the physical properties and storage stability of the powder coating material, and dodecanedioic acid is particularly preferably used in consideration of the physical properties of the coating film.

The above thermosetting agents may be used alone or in combination of two or more.

The amount of thermosetting agent is preferably 1% by mass or more and 30% by mass or less and is more preferably 3% by mass or more and 20% by mass or less of the amount of thermosetting resin.

In the case where the powder particles are the core-shell particles described below and the thermosetting resin is used as a resin constituting the resin shells, the amount of thermosetting agent is determined relative to the total amount of the thermosetting resin included in the cores and the resin shells.

Colorant

Examples of the colorant include a pigment. As colorants, a pigment may be used in combination with a dye.

Examples of a black pigment include carbon black, copper oxide, manganese dioxide, aniline black, active carbon, non-magnetic ferrite, and magnetite.

Examples of a white pigment include known white pigments, such as titanium oxide, barium sulfate, zinc oxide, and calcium carbonate.

The above colorants may be used alone or in combination of two or more.

The content of the colorant is determined in accordance with, for example, the type of the pigment and the brightness and color depth required by the coating film.

For example, the amount of the colorant is preferably 1% by mass or more and 70% by mass or less and is more preferably 2% by mass or more and 60% by mass or less of the total amount of the resins constituting the powder particles.

Metal Ion Having Valence of Two or More

The metal ion having a valence of two or more (hereinafter, referred to simply as "metal ion") is a component included in both cores and resin shells of the powder particles in the case where the powder particles are the core-shell particles described below.

Adding the metal ion having a valence of two or more to the powder particles enables the powder particles to form ionic crosslinks with the metal ion. For example, a functional group of the thermosetting resin (e.g., in the case where the thermosetting polyester resin is used as a thermosetting resin, the carboxyl group or hydroxyl group of the thermosetting polyester resin) and the metal ion form ionic crosslinks as a result of the interaction therebetween. The ionic crosslinks reduce the likelihood of the inclusions of the powder particles (i.e., the thermosetting agent and other additives that are optionally further added to the powder particles, such as the colorant) becoming precipitated on the surfaces of the powder particles (this phenomenon is commonly referred to as "bleeding") and, consequently, enhance the storage stability of the powder coating material. The ionic crosslinks become broken when the powder coating material is cured by heating after the powder coating material has been applied to an item. This reduces the melt viscosity of the powder particles and, consequently, makes it easy to form a coating film having a high degree of smoothness.

Examples of the metal ion include metal ions having a valence of two to four. Specifically, the metal ion may be at least one metal ion selected from the group consisting of an aluminum ion, a magnesium ion, an iron ion, a zinc ion, and a calcium ion.

Examples of a source of the metal ion (i.e., a compound added to the powder particles as an additive) include a metal salt, an inorganic metal salt polymer, and a metal complex. The metal salt and the inorganic metal salt polymer are added to the powder particles as, for example, a coagulant in the case where the powder particles are prepared by an aggregation-coalescence method.

Examples of the metal salt include aluminum sulfate, aluminum chloride, magnesium chloride, magnesium sulfate, iron(II) chloride, zinc chloride, calcium chloride, and calcium sulfate.

Examples of the inorganic metal salt polymer include polyaluminum chloride, polyaluminum hydroxide, polyferric sulfate, and calcium polysulfide.

Examples of the metal complex include metal salts of aminocarboxylic acid. Specific examples of the metal complex include metal salts (e.g., a calcium salt, a magnesium salt, an iron salt, and an aluminum salt) of known chelates including ethylenediaminetetraacetic acid, propanediaminetetraacetic acid, nitrilotriacetic acid, triethylenetetraminehexaacetic acid, diethylenetriaminepentaacetic acid, or the like.

The above sources of the metal ion may be added to the powder particles as an additive instead of as a coagulant.

The higher the valence of the metal ion, the higher the likelihood of formation of net-like ionic crosslinks, which suitably enhances the smoothness of the coating film and the storage stability of the powder coating material. Accordingly, an aluminum (Al) ion may be used as a metal ion. That is, the source of the metal ion may be an aluminum salt (e.g., aluminum sulfate or aluminum chloride) or an aluminum salt polymer (e.g., polyaluminum chloride or polyaluminum hydroxide). Among sources of metal ions having the same valence, inorganic metal salt polymers may be more preferable than metal salts in order to enhance the smoothness of the coating film and the storage stability of the powder coating material. Therefore, among the above sources of the metal ion, in particular, an aluminum salt polymer (e.g., polyaluminum chloride or polyaluminum hydroxide) may be used.

The amount of the metal ion is preferably 0.002% by mass or more and 0.2% by mass or less and is more preferably 0.005% by mass or more and 0.15% by mass or less of the total amount of the powder particles in order to enhance the smoothness of the coating film and the storage stability of the powder coating material.

Setting the content of the metal ion to 0.002% by mass or more enables the formation of adequate ionic crosslinks with the metal ion, which may reduce bleeding of the powder particles and, consequently, enhance the storage stability of the coating material. Setting the content of the metal ion to 0.2% by mass or less prevents excessive formation of ionic crosslinks with the metal ion and, consequently, enhances the smoothness of the coating film.

In the case where the powder particles are prepared by an aggregation-coalescence method, the source (i.e., a metal salt or a metal salt polymer) of the metal ion, which is added to the powder particles as a coagulant, contributes to the control of the particle size distribution and shape of the powder particles.

Specifically, the higher the valance of the metal ion, the narrower the particle size distribution of the powder particles. Among sources of metal ions having the same valence, metal salt polymers may be more preferable than metal salts in order to form powder particles having a narrow particle size distribution. Also for the above reasons, the source of the metal ion is preferably an aluminum salt (e.g., aluminum sulfate or aluminum chloride) or an aluminum salt polymer (e.g., polyaluminum chloride or polyaluminum hydroxide) and is particularly preferably an aluminum salt polymer (e.g., polyaluminum chloride or polyaluminum hydroxide).

Adding the coagulant to the powder particles such that the content of the metal ion is 0.002% by mass or more promotes the aggregation of resin particles in an aqueous medium and, consequently, narrows the particle size distribution of the powder particles. Furthermore, the aggregation of resin particles which constitute the resin shells on the aggregated particles that serve as cores becomes promoted. As a result, the resin shells may be formed over the entire surfaces of the cores. Adding the coagulant to the powder particles such that the content of the metal ion is 0.2% by mass or less prevents excessive formation of ionic crosslinks in the aggregated particles and increases the likelihood of the shape of the powder particles formed by fusion coalescence becoming close to spherical. Also for the above reasons, the content of the metal ion is preferably 0.002% by mass or more and 0.2% by mass or less and is more preferably 0.005% by mass or more and 0.15% by mass or less.

The content of the metal ion is determined by quantitative analysis of the fluorescent x-ray intensity of the powder particles. Specifically, for example, the source of the metal ion is mixed with a resin to form a resin mixture containing the metal ion at a known concentration, and 200 mg of the resin mixture is formed into a pellet sample with a tablet press machine having a diameter of 13 mm. The mass of the pellet sample is precisely measured. The fluorescent x-ray intensity of the pellet sample and the peak intensity are measured. Pellet samples that contain the source of the metal ion at different concentrations are also prepared and subjected to the above measurement. A calibration curve is prepared on the basis of the results of the above measurements. The content of the metal ion in the powder particles that are to be measured is quantitatively analyzed using the calibration curve.

For adjusting the content of the metal ion, for example, the following methods may be used:

1) A method in which the amount of the source of the metal ion added to the powder particles is adjusted; and 2) A method in which, in the preparation of the powder particles by an aggregation-coalescence method, after the coagulant (e.g., a metal salt or a metal salt polymer) has been added to the powder particles as a source of the metal ion in the aggregation step, a chelating agent (e.g., ethylenediaminetetraacetic acid (EDTA), diethylenetriaminepentaacetic acid (DTPA), or nitrilotriacetic acid (NTA)) is added to the powder particles at the end of the aggregation step in order to form a complex of the metal ion with the chelating agent and the resulting complex salt is removed in the subsequent step, such as a cleaning step, in order to adjust the content of the metal ion.

Other Additives

Examples of the other additives include various additives used for producing powder coating materials.

Specific examples of the other additives include a defoaming agent (e.g., benzoin or a benzoin derivative), a curing accelerator (e.g., an amine, an imidazole, or a cationic polymerization catalyst), a surface modifier (e.g., a leveling agent), a plasticizer, a charge-controlling agent, an antioxidant, a pigment dispersant, a flame retardant, and a flowability-imparting agent.

Core-Shell Particles

The powder particles may be core-shell particles constituted by cores including the thermosetting resin and the thermosetting agent and resin shells that cover the surfaces of the cores.

The cores may optionally further include the colorant, the metal ion having a valence of two or more, and the other additives.

The resin shells of the core-shell particles are described below.

The resin shells may be composed only of a resin or may further include a component other than a resin, such as the thermosetting agent, the metal ion having a valence of two or more, and the other additives which are described above as components of the cores.

The resin shells may be composed only of a resin in order to reduce the occurrence of bleeding. When the resin shells further include a component other than a resin, the amount of resin may be 90% by mass or more and is preferably 95% by mass or more of the total amount of resin shells.

The resin that constitutes the resin shells may be either a non-curable resin or a thermosetting resin. In particular, a thermosetting resin may be used in order to increase the curing density (i.e., crosslinking density) of the coating film.

In the case where a thermosetting resin is used as a resin constituting the resin shells, examples of the thermosetting resin used for forming the resin shells may be the same as the above-described examples of the thermosetting resin used for forming the cores. The type of the thermosetting resin included in the resin shells may be the same as or different from the type of the thermosetting resin included in the cores.

In the case where a non-curable resin is used as a resin constituting the resin shells, the non-curable resin may be at least one selected from the group consisting of an acrylic resin and a polyester resin.

The coverage of the resin shells is preferably 30% or more and 100% or less and is more preferably 50% or more and 100% or less in order to reduce the occurrence of bleeding.

The coverage of the resin shells on the surfaces of the powder particles is determined by X-ray photoelectron spectroscopy (XPS).

Specifically, the XPS analysis is conducted using an XPS analyzer "JPS-9000MX" produced by JEOL Ltd. and Mg-K$\alpha$ radiation as an X-ray source with an acceleration voltage of 10 kV and an emission current of 30 mA.

On the basis of the spectrum measured under the above conditions, a component resulting from the material of the cores that are present on the surfaces of the powder particles and a component resulting from the material of the resin shells that are present on the surfaces of the powder particles are determined by peak separation, and the coverage of the resin shells on the surfaces of the powder particles is determined. In the peak separation, the measured spectrum is separated into components by the linear least squares fitting technique.

Spectra each obtained by measuring only the specific one of the thermosetting resin, the curing agent, the pigment, the additive, and the coating resin used in the preparation of the powder particles are used as reference component spectra for the separation. The coverage of the resin shells is determined on the basis of the ratio of the intensity of the spectrum resulting from the coating resin to the total sum of the intensities of all spectra measured using the powder particles.

The thickness of the resin shells is preferably 0.2 μm or more and 4 μm or less and is more preferably 0.3 μm or more and 3 μm or less in order to reduce the occurrence of bleeding.

The thickness of the resin shells is determined by the following method. The powder particles are buried in an epoxy resin piece or the like, which is then sliced into a thin piece with a diamond knife or the like. The thin piece is observed with a transmission electron microscope (TEM) or the like, and a cross-sectional image of plural powder particles is captured. The thickness of the resin shells is measured at 20 positions in the cross-sectional image of the powder particles, and the average thereof is considered to be the thickness of the resin shells. In the case where it is difficult to observe the resin shells in the cross-sectional image because, for example, the powder coating material is transparent, the powder coating material may be colored in order to facilitate the observation.

Properties of Powder Particles

Volume Particle Diameter Distribution Index GSDv

The volume particle diameter distribution index GSDv of the powder particles is preferably 1.50 or less, is more preferably 1.40 or less, and is further preferably 1.30 or less in order to enhance the smoothness of the coating film and the storage stability of the powder coating material. Setting the volume particle diameter distribution index GSDv of the powder particles to be 1.50 or less may limit the degradation of the smoothness of the coating film.

Volume-Average Diameter D50v

The volume-average diameter D50v of the powder particles is preferably 1 μm or more and 40 μm or less, is more preferably 1 μm or more and 25 μm or less, is further preferably 2 μm or more and 20 μm or less, and is particularly preferably 3 μm or more and 15 μm or less in order to form a coating film having a high degree of smoothness with a small amount of powder coating material.

Setting the volume-average diameter of the powder particles to fall within the above small-diameter range, it becomes easy to control the matt level of the coating film with the specific inorganic particles. In addition, it becomes easy to form a coating film having a highly uniform thickness and a high strength.

The volume-average diameter D50v and the volume particle diameter distribution index GSDv of the powder particles are measured with "COULTER Multisizer II" produced by Beckman Coulter, Inc. with an electrolytic solution "ISOTON-II" produced by Beckman Coulter, Inc.

Specifically, a sample to be measured (0.5 mg or more and 50 mg or less) is added to 2 ml of a 5% aqueous solution of a surfactant (e.g., sodium alkylbenzene sulfonate) that serves as a dispersant. The resulting mixture is added to 100 ml or more and 150 ml or less of the electrolytic solution.

The electrolytic solution containing the sample suspended therein is dispersed for 1 minute using an ultrasonic disperser. The distribution of the diameters of particles having a diameter of 2 μm or more and 60 μm or less is measured using COULTER Multisizer II with an aperture having a diameter of 100 μm. The number of the particles sampled is 50,000.

The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 16% is considered to be the volume particle diameter D16v. A particle diameter at which the cumulative volume reaches 50% is considered to be the volume-average diameter D50v. A particle diameter at which the cumulative volume reaches 84% is considered to be the volume particle diameter D84v.

The volume particle diameter distribution index (GSDv) is calculated as $(D84v/D16v)^{1/2}$.

Average Circularity

The average circularity of the powder particles is preferably 0.97 or more, is more preferably 0.98 or more, and is further preferably 0.99 or more.

Setting the average circularity of the powder particles to be 0.97 or more reduces the surface area of the powder particles and the amount of electric charge stored on the surfaces of the powder particles and, consequently, may limit the formation of irregularities (i.e., burst traces) in the coating film.

The average circularity of the powder particles is measured with a flow particle image analyzer "FPIA-3000" produced by Sysmex Corporation. Specifically, 0.1 ml or more and 0.5 ml or less of a surfactant (e.g., alkylbenzene sulfonic acid salt) that serves as a dispersant is added to 100 ml or more and 150 ml or less of water from which solid impurities have been removed. To the resulting mixture, 0.1 g or more and 0.5 g or less of a sample that is to be measured is added. The resulting suspension containing the sample dispersed therein is dispersed for 1 minute or more and 3 minutes or less using an ultrasonic disperser such that the concentration of the dispersion is 3,000 particles/μl or more and 10,000 particles/μl or less. The average circularity of the powder particles is measured using the dispersion with the flow particle image analyzer.

The average circularity of the powder particles is calculated using the following formula on the basis of the circularities (Ci) of n particles selected from the powder particles. In the following formula, Ci represents circularity of a particle, that is, [Circumference of a circle having an area equal to the projected area of the particle]/[Circumference of the projected image of the particle]), and fi represents the frequency of the powder particle.

$$\text{average circularity}(Ca) = \left(\sum_{i=1}^{n} (Ci \times fi)\right) / \sum_{i=1}^{n} (fi)$$

Method for Producing Powder Coating Material

A method for producing the powder coating material according to an exemplary embodiment is described below.

The powder coating material according to an exemplary embodiment is produced by preparing the powder particles and depositing the external additive including the inorganic particles on the surfaces of the powder particles.

The powder particles may be produced by either a dry process (e.g., knead pulverization) or a wet process (e.g., an aggregation-coalescence method, a suspension polymerization method, or a dissolution suspension method). The method for producing the powder particles is not limited to the above production methods; known production methods may be used.

Examples of the dry process include 1) a knead pulverization method in which the thermosetting resin and the other raw materials are kneaded, pulverized, and classified and 2) a dry process in which particles are prepared by the knead pulverization method and the shapes of the particles are changed by the application of a mechanical impact force or thermal energy.

Examples of the wet process include 1) an aggregation-coalescence method in which a dispersion containing a polymer produced by emulsion polymerization of a polymerizable monomer used for producing the thermosetting resin is mixed with dispersions containing the other raw materials and the resulting mixture is subjected to an aggregation treatment and a fusion treatment in order to form powder particles; 2) a suspension polymerization method in which a polymerizable monomer used for producing the thermosetting resin and a solution of the other raw materials are suspended in an aqueous solvent and the resulting suspension is subjected to a polymerization reaction; and 3) a dissolution suspension method in which the thermosetting resin and a solution of the other raw materials are suspended in an aqueous solvent and particles are formed using the resulting suspension. Among the above methods, a wet process may reduce thermal impacts.

Optionally, core-shell powder particles may be produced by depositing resin particles on the surfaces of the powder particles produced by the above production method, that is, cores, and fusing the resin particles.

Among the above production methods, an aggregation-coalescence method may be used for producing the powder particles in order to readily control the volume particle diameter distribution index GSDv, the volume-average diameter D50v, and the average circularity of the powder particles to fall within the above respective ranges.

An aggregation-coalescence method in which core-shell powder particles are produced is described as an example below.

Specifically, the powder particles may be produced by a method including:

a step in which first aggregated particles are formed by causing first resin particles including the thermosetting resin and the thermosetting agent to aggregate together in a dispersion containing the first resin particles and the thermosetting agent dispersed therein or by causing composite particles including the thermosetting resin and thermosetting agent to aggregate together in a dispersion containing the composite particles dispersed therein (hereinafter, this step is referred to as "first aggregated particle-formation step");

a step in which second aggregated particles including the first aggregated particles and second resin particles including a resin which are deposited on the surfaces of the first aggregated particles are formed by mixing a first aggregated particle dispersion containing the first aggregated particles dispersed therein with a second resin particle dispersion containing the second resin particles dispersed therein and causing the second resin particles to aggregate on the surfaces of the first aggregated particles (i.e., second aggregated particle-formation step); and a step in which a second aggregated particle dispersion containing the second aggregated particles dispersed therein is heated in order to cause the fusion and coalescence of the second aggregated particles (hereinafter, this step is referred to as "fusion coalescence step").

In the powder particles produced by the above aggregation-coalescence method, portions of the powder particles which are formed as a result of the fusion coalescence of the first aggregated particles serve as cores, while portions of the powder particles which are formed as a result of the fusion coalescence of the second resin particles, which are deposited on the surfaces of the first aggregated particles, serve as resin shells.

Therefore, it is possible to produce powder particles having a single-layer structure by omitting the second aggregated particle-formation step and subjecting the first aggregated particles formed in the first aggregated particle-formation step to the fusion coalescence step, in which the first aggregated particles are directly subjected to fusion and coalescence instead of the second aggregated particles.

The detail of each of the above steps is described below.

Although a method for producing powder particles including a colorant is described below, the colorant is an optional component.

Dispersion Preparation Step

Dispersions used in the aggregation-coalescence method are prepared.

Specifically, the following dispersions are prepared: a first resin particle dispersion that contains first resin particles including the thermosetting resin which constitute cores and are dispersed in the dispersion; a thermosetting agent dispersion that contains the thermosetting agent dispersed therein; a colorant dispersion that contains the colorant dispersed therein; and a second resin particle dispersion that contains second resin particles including a resin which constitute resin shells and are dispersed in the dispersion.

Alternatively, a composite particle dispersion that contains composite particles dispersed therein, the composite particles including the thermosetting resin that constitutes the cores and the thermosetting agent, may be prepared instead of the first resin particle dispersion and the thermosetting agent dispersion.

Note that, in the steps of the method for producing the powder coating material, the first resin particles, the second resin particles, and the composite particles are referred to collectively as "resin particles" and dispersions containing the above resin particles are referred to as "resin particle dispersion".

The resin particle dispersion is prepared by, for example, dispersing the resin particles in a dispersion medium with a surfactant.

Examples of the dispersion medium used for preparing the resin particle dispersion include an aqueous medium.

Examples of the aqueous medium include water, such as distilled water or ion-exchange water; and an alcohol. The above aqueous media may be used alone or in combination of two or more.

Examples of the surfactant include anionic surfactants, such as a sulfate surfactant, a sulfonate surfactant, a phosphate surfactant, and a soap surfactant; cationic surfactants, such as an amine salt surfactant and a quaternary ammonium salt surfactant; and non-ionic surfactants, such as a polyethylene glycol surfactant, an alkylphenol-ethylene oxide adduct surfactant, and a polyhydric alcohol surfactant. Among the above surfactants, in particular, the anionic surfactants and the cationic surfactants may be used. The non-ionic surfactants may be used in combination with the anionic surfactants or the cationic surfactants.

The above surfactants may be used alone or in combination of two or more.

In the preparation of the resin particle dispersion, the resin particles may be dispersed in the dispersion medium by a common dispersion method in which, for example, a rotary-shearing homogenizer or a ball mill, a sand mill, or a dyno mill that includes media is used. Depending on the type of the resin particles used, the resin particles may be dispersed in the resin particle dispersion by, for example, phase-inversion emulsification.

Phase-inversion emulsification is a method in which a resin that is to be dispersed is dissolved in a hydrophobic organic solvent in which the resin is soluble, a base is added to the resulting organic continuous phase (i.e., 0 phase) to perform neutralization, an aqueous medium (i.e., W phase) is subsequently charged to convert the resin from W/0 to O/W, that is, phase inversion, in order to create a discontinuous phase, and the resin is thereby dispersed in the aqueous medium in the form of particles.

The resin particle dispersion may be prepared by, for example, the following method.

Specifically, for example, when the resin particle dispersion is a polyester resin particle dispersion containing polyester resin particles dispersed therein, the polyester resin particle dispersion is prepared by melting raw material monomers by heating, performing polycondensation of the molten raw material monomers at a reduced pressure, dissolving the resulting polycondensate in a solvent (e.g., ethyl acetate), and stirring the solution while adding a weak-alkaline aqueous solution to the solution in order to perform phase-inversion emulsification.

In the case where the resin particle dispersion is a composite particle dispersion, the composite particle dispersion is prepared by dispersing a mixture of the thermosetting resin and the thermosetting agent in a dispersion medium (e.g., emulsification, such as phase-inversion emulsification).

The volume-average diameter of the resin particles dispersed in the resin particle dispersion may be, for example, 1 µm or less, is preferably 0.01 µm or more and 1 µm or less, is more preferably 0.08 µm or more and 0.8 µm or less, and is further preferably 0.1 µm or more and 0.6 µm or less.

The volume-average diameter of the resin particles is determined in the following manner. The particle diameter distribution of the resin particles is obtained using a laser diffraction particle size distribution analyzer (e.g., "LA-700" produced by HORIBA, Ltd.). The particle diameter distribution measured is divided into a number of particle diameter ranges (i.e., channels). For each range, in ascending order in terms of particle diameter, the cumulative volume is calculated and plotted to draw a cumulative distribution curve. A particle diameter at which the cumulative volume reaches 50% is considered to be the volume-average particle diameter D50v. The volume-average diameters of particles included in the other dispersions are also determined in the above-described manner.

Although known emulsification methods may be used for preparing the resin particle dispersion, in particular, phase-inversion emulsification may be used in order to narrow the particle size distribution of the resin particles and readily adjust the volume-average diameter of the resin particles to be 1 µm or less (in particular, 0.08 µm or more and 0.40 µm or less).

In phase-inversion emulsification, a resin is dissolved in an organic solvent in which the resin is soluble, an amphipathic organic solvent, or a mixed solvent thereof to form an oil phase. While the oil phase is stirred, a small amount of basic compound is added dropwise to the oil phase. Subsequently, while the oil phase is further stirred, water is added dropwise to the oil phase gradually in small amounts, such that water droplets are incorporated in the oil phase. When the amount of water droplets added to the oil phase exceeds a certain amount, inversion occurs between the oil and water phases, that is, the oil phase forms oil droplets. The inverted emulsion is subjected to a solvent removal step at a reduced pressure to form an aqueous dispersion.

The term "amphipathic organic solvent" used herein refers to an organic solvent having a solubility of at least 5 g/L or more (desirably 10 g/L or more) in water at 20° C. If the above solubility is less than 5 g/L, the organic solvent is not capable of sufficiently increasing the rate at which the emulsion is converted into an aqueous dispersion. Furthermore, the resulting aqueous dispersion may have poor storage stability. Examples of the amphipathic organic solvent include alcohols, such as ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol, and cyclohexanol; ketones, such as methyl ethyl ketone, methyl isobutyl ketone, ethyl butyl ketone, cyclohexanone, and isophorone; ethers, such as tetrahydrofuran and dioxane; esters, such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, and dimethyl carbonate; glycol derivatives, such as ethylene glycol, ethylene glycol monomethyl ether, ethylene glycol monoethyl ether, ethylene glycol monopropyl ether, ethylene glycol monobutyl ether, ethylene glycol ethyl ether acetate, diethylene glycol, diethylene glycol monomethyl ether, diethylene glycol monoethyl ether, diethylene glycol monopropyl ether, diethylene glycol monobutyl ether, diethylene glycol ethyl ether acetate, propylene glycol, propylene glycol monomethyl ether, propylene glycol monopropyl ether, propylene glycol monobutyl ether, propylene glycol methyl ether acetate, and dipropylene glycol monobutyl ether; and 3-methoxy-3-methylbutanol, 3-methoxybutanol, acetonitrile, dimethylformamide, dimethylacetamide, diacetone alcohol, and ethyl acetoacetate. The above solvents may be used alone or in a mixture of two or more.

The thermosetting polyester resin used as a thermosetting resin becomes neutralized with the basic compound when it is dispersed in the aqueous medium. The neutralization reaction between the carboxyl group of the thermosetting polyester resin and the basic compound causes the formation of the aqueous dispersion. In addition, the aggregation of the particles is reduced due to electric repulsion between the resulting carboxyl anions.

Examples of the basic compound include ammonia and an organic amine having a boiling point of 250° C. or less. Examples of the organic amine include triethylamine, N,N-diethylethanolamine, N,N-dimethylethanolamine, aminoethanolamine, N-methyl-N,N-diethanolamine, isopropylamine, iminobispropylamine, ethylamine, diethylamine, 3-ethoxypropylamine, 3-diethylaminopropylamine, sec-butylamine, propylamine, methylaminopropylamine, dimethylaminopropylamine, methyliminobispropylamine, 3-methoxypropylamine, monoethanolamine, diethanolamine, triethanolamine, morpholine, N-methylmorpholine, and N-ethylmorpholine.

The amount of the basic compound used may be set in accordance with the amount of the carboxyl groups included in the thermosetting polyester resin such that at least a part of the carboxyl groups are neutralized with the basic compound. That is, the amount of basic compound used is preferably 0.2 times or more and 9.0 times or less and is more preferably 0.6 times or more and 2.0 times or less the chemical equivalent amount of the carboxyl groups. Setting the amount of the basic compound used to be 0.2 times or more the chemical equivalent amount of the carboxyl groups enables the effects of the addition of the basic compound to be noticeable. Setting the amount of basic compound used to be 9.0 times or less the chemical equivalent amount of the carboxyl groups reduces the formation of powder particles having a wide particle-size distribution and makes it easy to prepare a suitable dispersion. This is presumably because setting the amount of basic compound used to fall within the above range prevents an excessive increase in the hydrophilicity of the oil phase.

The content of the resin particles in the resin particle dispersion is preferably, for example, 5% by mass or more and 50% by mass or less and is more preferably 10% by mass or more and 40% by mass or less.

The thermosetting agent dispersion, the colorant dispersion, and the like are also prepared as in the preparation of the resin particle dispersion. In other words, the above-described specifications for the volume-average diameter of the resin particles included in the resin particle dispersion, the dispersion medium of the resin particle dispersion, the dispersion method used for preparing the resin particle dispersion, and the content of the particles in the resin particle dispersion are applied to colorant particles dispersed in the colorant dispersion and particles of the thermosetting agent dispersed in the thermosetting agent particle dispersion.

First Aggregated Particle-Formation Step

The first resin particle dispersion is mixed with the thermosetting agent dispersion and the colorant dispersion.

In the resulting mixed dispersion, heteroaggregation of the first resin particles with the thermosetting agent and the colorant is performed in order to form first aggregated particles including the first resin particles, the thermosetting agent, and the colorant, the first aggregated particles having a diameter close to that of the desired powder particles.

Specifically, for example, a coagulant is added to the mixed dispersion, and the pH of the mixed dispersion is controlled to be acidic (e.g., pH of 2 or more and 5 or less). A dispersion stabilizer may be added to the mixed dispersion as needed. Subsequently, the mixed dispersion is heated to the glass transition temperature of the first resin particles (specifically, e.g., [Glass transition temperature of the first resin particles—30° C.] or more and [Glass transition temperature of the first resin particles—10° C.] or less), and thereby the particles dispersed in the mixed dispersion are caused to aggregate together to form first aggregated particles.

In the first aggregated particle-formation step, alternatively, a composite particle dispersion including the thermosetting resin and the thermosetting agent may be mixed with the colorant dispersion. The first aggregated particles may be formed in the mixed dispersion by heteroaggregation of the composite particles with the colorant.

In the first aggregated particle-formation step, alternatively, for example, the above-described coagulant may be added to the mixed dispersion at room temperature (e.g., 25° C.) while the mixed dispersion is stirred using a rotary-shearing homogenizer. Then, the pH of the mixed dispersion is controlled to be acidic (e.g., pH of 2 or more and 5 or less), and a dispersion stabilizer may be added to the mixed dispersion as needed. Subsequently, the mixed dispersion is heated in the above-described manner.

Examples of the coagulant include surfactants, metal salts, metal salt polymers, and metal complexes that have a polarity opposite to that of the surfactant that is added to the mixed dispersion as a dispersant. Using a metal complex as a coagulant reduces the amount of surfactant used and, as a result, enhances charging characteristics.

After the termination of aggregation, an additive capable of forming a complex or a bond similar to a complex with the metal ions included in the coagulant may optionally be used. Examples of the additive include a chelating agent. The addition of the chelating agent enables the content of the metal ion in the powder particles to be controlled in the case where the amount of coagulant added to the dispersion is excessively large.

The metal salt, metal salt polymer, or metal complex that serves as a coagulant is also used as a source of the metal ions. Examples of the metal salt, metal salt polymer, or metal complex are as described above.

Examples of the chelating agent include a water-soluble chelating agent. Specific examples of the chelating agent include oxycarboxylic acids, such as tartaric acid, citric acid, and gluconic acid; and imino diacid (IDA), nitrilotriacetic acid (NTA), and ethylenediaminetetraacetic acid (EDTA).

The amount of the chelating agent used may be, for example, 0.01 parts by mass or more and 5.0 parts by mass or less and is preferably 0.1 parts by mass or more and less than 3.0 parts by mass relative to 100 parts by mass of the resin particles.

Second Aggregated Particle-Formation Step

The first aggregated particle dispersion containing the first aggregated particles dispersed therein is mixed with a second resin particle dispersion.

The type of the second resin particles may be the same as or different from the type of the first resin particles.

In the mixed dispersion that contains the first aggregated particles and the second resin particles dispersed therein, second aggregated particles that include the first aggregated particles and the second resin particles deposited on the surfaces of the first aggregated particles are formed by causing the second resin particles to aggregate together so as to be deposited on the surfaces of the first aggregated particles.

Specifically, for example, when the diameter of the first aggregated particles reaches a predetermined diameter in the first aggregated particle-formation step, the second resin particle dispersion is mixed with the first aggregated particle dispersion. The resulting mixed dispersion is heated to a temperature equal to or lower than the glass-transition temperature of the second resin particles.

The aggregation of the second resin particles is stopped by adjusting the pH of the mixed dispersion to be, for example, about 6.5 or more and 8.5 or less.

By the above method, the second aggregated particles that include the first aggregated particles and the second resin particles aggregated on the surfaces of the first aggregated particles so as to be deposited thereon are prepared.

Fusion-Coalescence Step

The second aggregated particle dispersion in which the second aggregated particles are dispersed is heated to, for example, a temperature equal to or higher than the glass transition temperatures of the first and second resin particles (e.g., a temperature higher than the glass transition temperatures of the first and second resin particles by 10° C. to 30° C.) in order to perform fusion and coalescence of the second aggregated particles. Hereby, powder particles are prepared.

The powder particles are prepared through the above-described steps.

After the termination of the fusion-coalescence step, the powder particles formed in the dispersion are subjected to a known cleaning step, a known solid-liquid separation step, and a known drying step in order to prepare dry powder particles.

In the cleaning step, the powder particles may be subjected to displacement washing using ion-exchange water to a sufficient degree from the viewpoint of charging characteristics. Examples of a solid-liquid separation method used in the solid-liquid separation step include, but are not limited to, suction filtration and pressure filtration from the viewpoint of productivity. Examples of a drying method used in the drying step include, but are not limited to, freeze drying, flash-jet drying, fluidized drying, and vibrating fluidized drying from the viewpoint of productivity.

The powder coating material according to an exemplary embodiment is produced by adding the external additive to the dried powder particles and mixing the resulting powder particles using a V-blender, a Henschel mixer, a Lodige mixer, or the like.

Optionally, coarse particles may be removed from the powder particles using a vibrating screen classifier, a wind screen classifier, or the like.

Coated Item and Method for Producing Coated Item

A coated item according to an exemplary embodiment is an item coated with the powder coating material according to an exemplary embodiment. A method for producing the coated item according to an exemplary embodiment is a method for producing a coated item in which an item is coated with the powder coating material according to an exemplary embodiment.

The method for coating an item with the powder coating material includes a step in which, for example, the powder coating material is charged and sprayed onto an item that is to be coated in order to deposit (i.e., apply) the powder coating material on the item (hereinafter, this step is referred to as "application step"), and a step in which the powder coating material deposited on the item is heated to form a coating film (hereinafter, this step is referred to as "burn-in step").

Each of the above steps is described below.

Application Step

In the application step, the charged powder coating material is ejected to an item that is to be coated such that the powder coating material is electrostatically deposited (applied) on the item and forms a deposition layer.

Specifically, the deposition layer is formed in the application step by, for example, the following method: while an electrostatic field is created between the ejection port of an electrostatic powder coater and a conductive surface of the item which is to be coated, the charged powder coating material is ejected from an ejection port of the electrostatic powder coater so as to be electrostatically deposited on the surface of the item which is to be coated and form a deposition layer. More specifically, for example, a voltage is applied between an anode that is the surface of the item which is to be coated, the item being grounded, and a cathode that is the electrostatic powder coater in order to create an electrostatic field between the anode and the cathode. The electrostatic field causes the charged powder coating material to fly and electrostatically deposit on the surface of the item. As a result, a film composed of the powder coating material is formed on the surface of the item.

The above application step may be conducted while the ejection port of the electrostatic powder coater and the surface of the item which is to be coated are moved relative to each other.

Examples of the electrostatic powder coater include known electrostatic powder coaters, such as a corona gun (i.e., a coater that ejects a powder coating material charged by corona discharge), a tribo gun (i.e., a coater that ejects a powder coating material by triboelectrification), and a bell gun (i.e., a coater that ejects a powder coating material charged by corona discharge or triboelectrification in a centrifugal manner). The ejection conditions required for achieving suitable coating are as specified by each gun.

The amount of the powder coating material deposited on the coated surface of the item may be 20 g/m$^2$ or more and 100 g/m$^2$ or less and is preferably 25 g/m$^2$ or more and 50 g/m$^2$ or less in order to reduce variations in the smoothness of the coating film.

If the thickness of the coating film formed on the coated item is large, that is, the amount of the powder coating material deposited on the surface of the item is large (e.g., 130 g/m$^2$ or more), the accumulation of electric charge is increased and, consequently, the formation of irregularities (i.e., burst traces) in the coating film may be increased. In contrast, in this exemplary embodiment, the accumulation of electric charge in the deposition layer is reduced as described above and, accordingly, the formation of irregularities (i.e., burst traces) in the coating film may be reduced.

Burn-in Step

In the burn-in step, the deposition layer is heated to form a coating film. Specifically, the powder particles included in the film composed of the powder coating material are melted and cured by heating to form a coating film.

The heating temperature (i.e., the burn-in temperature) is set in accordance with the type of the powder coating material used. For example, the heating temperature (i.e., the burn-in temperature) is preferably, for example, 90° C. or more and 250° C. or less, is more preferably 100° C. or more and 220° C. or less, and is further preferably 120° C. or more and 200° C. or less. The amount of heating time (i.e., burn-in time) is adjusted in accordance with the heating temperature (i.e., the burn-in temperature).

Item to be Coated

Examples of the item that is to be coated with the powder coating material include, but are not limited to, various metal parts, ceramic parts, and resin parts. The items may be either an item that has not been formed into a shape, such as a tabular shape or a linear shape, or an item that has been formed into a shape, such as a material for electronic parts, road vehicle parts, or a building interior or exterior material.

The surface of the item which is to be coated may be subjected to a surface treatment, such as a primer treatment, a plating process, or electrodeposition coating.

EXAMPLES

The above-described exemplary embodiments are described in detail with reference to Examples below. The exemplary embodiments are not limited by the Examples below. Hereinafter, "part" and "%" are on a mass basis unless otherwise specified.

White Powder Particles (PC1)

Preparation of Polyester Resin-Curing Agent Composite Dispersion (E1)

While a jacketed 3-liter reaction vessel "BJ-30N" produced by TOKYO RIKAKIKAI CO, LTD. equipped with a condenser, a thermometer, a water dropper, and an anchor paddle is maintained at 40° C. in a water-circulation thermostat, a mixed solvent of 180 parts of ethyl acetate and 80 parts of isopropyl alcohol is added to the reaction vessel. The following components are charged into the reaction vessel.

Polyester resin (PES1) [Polycondensate of terephthalic acid/ethylene glycol/neopentyl glycol/trimethylolpropane (molar ratio: 100/60/38/2 (mol %), glass-transition temperature: 62° C., acid value (Av): 12 mgKOH/g, hydroxyl value (OHv): 55 mgKOH/g, weight-average molecular weight (Mw): 12,000, number-average molecular weight (Mn): 4,000]: 240 parts Blocked isocyanate curing agent "VESTAGON B 1530" produced by EVONIK: 60 parts Benzoin: 1.5 parts Acrylic oligomer "Acronal 4F" produced by BASF SE: 3 parts The resulting mixture is stirred with a three-one motor at 150 rpm to form a solution. Hereby, an oil phase is formed. A liquid mixture of 1 part of a 10 mass % aqueous ammonia solution and 47 parts of a 5 mass % aqueous sodium hydroxide solution is added dropwise to the stirred oil phase over 5 minutes. After the resulting mixture has been stirred for 10 minutes, 900 parts of ion-exchange water is added dropwise to the mixture at a rate of 5 part/min in order to perform phase inversion. Hereby, an emulsion is formed.

Subsequently, 800 parts of the emulsion and 700 parts of ion-exchange water are immediately charged into a 2-liter eggplant flask, which is then connected to an evaporator produced by TOKYO RIKAKIKAI CO, LTD. equipped with a vacuum-control unit with a trap ball interposed therebetween. While the eggplant flask is rotated, it is heated in a hot-water bath maintained at 60° C. The pressure is reduced to 7 kPa to remove the solvent, with due attention paid to avoiding bumping. When the amount of solvent recovered reaches 1,100 parts, the pressure is increased to normal pressure (i.e., 1 atmospheric pressure) and the eggplant flask is cooled with water. Hereby, a dispersion is formed. The dispersion does not have the odor of the solvent. The volume-average diameter of the resin particles included in the dispersion is 145 nm. An anionic surfactant "Dowfax2A1" (active ingredient: 45 mass %) produced by The Dow Chemical Company is added to the dispersion such that the amount of the active ingredient of the anionic surfactant is 2% by mass of the amount of resin component of the dispersion. Subsequently, ion-exchange water is added to the dispersion such that the concentration of the solid component in the dispersion is 25% by mass. This dispersion is used as a polyester resin-curing agent composite dispersion (E1).

Preparation of White Pigment Dispersion (W1)

Titanium oxide "A-220" produced by Ishihara Sangyo Kaisha, Ltd.: 100 parts

Anionic surfactant "Neogen RK" produced by DKS Co. Ltd.: 15 parts

Ion-exchange water: 400 parts

Nitric acid (0.3 mol/1): 4 parts

The above components are mixed together, and the resulting solution is dispersed for three hours with a high-pressure impact disperser "Ultimaizer HJP30006" produced by SUGINO MACHINE LIMITED CO., LTD. Hereby, a white pigment dispersion including titanium oxide particles dispersed therein is prepared. The results of measurement of the properties of the pigment dispersion with a laser diffraction particle size analyzer confirm that the volume-average diameter of the titanium oxide particles included in the pigment dispersion is 0.28 µm. The solid content in the white pigment dispersion is 25%.

Preparation of White Powder Particles (PC1)

Aggregation Step

Polyester resin-curing agent composite dispersion (E1): 180 parts (solid component: 45 parts)

White pigment dispersion (W1): 160 parts (solid component: 40 parts)

Ion-exchange water: 200 parts

In a round-bottom flask made of stainless steel, the above components are mixed with one another and dispersed with a homogenizer "ULTRA-TURRAX T50" produced by IKA. The pH of the resulting dispersion is adjusted to be 3.5 with a 1.0 mass % aqueous nitric acid solution. Subsequently, 0.50 parts of a 10 mass % aqueous polyaluminum chloride solution is added to the dispersion, which is further dispersed with the homogenizer.

Using a stirrer and a heating mantle, the dispersion is heated to 50° C. and held for 15 minutes while the number of rotations of the stirrer is adjusted such that the slurry is sufficiently stirred. Subsequently, the diameters of the aggregated particles are measured with a Coulter Counter Model TA-II (aperture diameter: 50 µm) produced by Beckman Coulter, Inc., and 60 parts of the polyester resin-curing agent composite dispersion (E1), which serves as a material for shells, is gradually charged into the dispersion when the volume-average diameter of the aggregated particles reaches 5.5 µm (charging of shells).

Fusion Coalescence Step

After the charging of shells, the dispersion is held for 30 minutes. Then, the pH of the dispersion is adjusted to be 7.0 with a 5% aqueous sodium hydroxide solution. The dispersion is subsequently heated to 85° C. and held for 2 hours.

Filtration, Cleaning, and Drying Step

After the reaction has been terminated, the solution contained in the flask is cooled and filtered to obtain a solid component. The solid component is cleaned with ion-exchange water and subjected to solid-liquid separation by Nutsche suction filtration. Hereby, a solid component is again obtained.

The solid component is again dispersed in 3 liters of ion-exchange water at 40° C. and stirred for 15 minutes at 300 rpm in order to perform cleaning. The above cleaning operation is repeated 5 times, and the solid component prepared by the solid-liquid separation using Nutsche suction filtration is vacuum-dried for 12 hours. Hereby, core-shell white powder particles (PC1) are prepared.

The results of measurement of the diameters of the white powder particles (PC1) confirm that the white powder particles (PC1) have a volume-average diameter D50v of 6.8 µm, a volume particle diameter distribution index GSDv of 1.24, and an average circularity of 0.97.

White Powder Particles (PC2)

White powder particles (PC2) are prepared as in the preparation of the white powder particles (PC1), except that, in the fusion coalescence step, the pH of the dispersion is adjusted to be 6.8, and the dispersion is subsequently heated to 87° C. and held for 2 hours.

The results of measurement of the diameters of the white powder particles (PC2) confirm that the white powder particles (PC2) have a volume-average diameter D50v of 6.5 μm, a volume particle diameter distribution index GSDv of 1.21, and an average circularity of 0.98.

White Powder Particles (PC3)

White powder particles (PC3) are prepared as in the preparation of the white powder particles (PC1), except that, in the fusion coalescence step, the pH of the dispersion is adjusted to be 6.4, and the dispersion is subsequently heated to 89° C. and held for 2.5 hours.

The results of measurement of the diameters of the white powder particles (PC3) confirm that the white powder particles (PC3) have a volume-average diameter D50v of 6.2 μm, a volume particle diameter distribution index GSDv of 1.22, and an average circularity of 0.95.

Example 1A

With 100 parts of the white powder particles (PC1), 0.6 parts of silica particles "RX200" produced by Nippon Aerosil Co., Ltd., which serve as an external additive, are mixed with a Henschel mixer at a peripheral velocity of 32 m/s for 10 minutes. Coarse particles are removed from the resulting powder particles through a 45 μm-mesh sieve. Hereby, a white powder coating material is prepared.

Examples 1B, 2A to 4A, and 2B to 4B and Comparative Examples 1A to 4A and 2B to 4B A powder coating material is prepared as in Example 1, except that the type of the powder particles and the type and amount of the external additive are changed as described in Table 1.

Comparative Example 5

The polyester resin (PES1), the blocked isocyanate curing agent, and the titanium oxide used in the preparation of the white powder particles (PC1) are prepared.

With the same amounts of the above components as in the preparation of the white powder particles (PC1), a matting material "ACEMATT OK520" (secondary average particle diameter: 6.5 μm) produced by Nippon Aerosil Co., Ltd. is added such that the amount of the matting material is 2.0% by mass of the amount of the white powder particles. The resulting mixture is kneaded. The kneaded mixture is pulverized and classified to form white powder particles having a volume-average diameter D50v of 7.0 μm and a volume particle diameter distribution index GSDv of 1.30. The white powder particles prepared in Comparative example 5 are used for coating without depositing any external additive on the surfaces of the powder particles.

Electrostatic Powder Coating

Each of the above powder coating materials is charged into a corona gun "XR4-110C" produced by ASAHI SUNAC CORPORATION.

While the corona gun is slid from side to side and up and down, the powder coating material is ejected onto a 30 cm×30 cm rectangular test panel (i.e., an item that is to be coated) that is a mirror-finished aluminum plate at a distance 30 cm from the front surface of the panel (i.e., the distance between the panel and the ejection port of the corona gun is 30 cm) so as to be electrostatically deposited on the panel and form a deposition layer. The voltage applied to the corona gun is 80 kV. The input air pressure is 0.55 MPa. The discharge rate of the corona gun is 200 g/min. The test panel is coated with the powder coating material 4 times while the amount of the powder coating material deposited on the panel is changed to be 50 g/m², 90 g/m², 180 g/m², and 220 g/m².

Subsequently, the panel is charged into a high-temperature chamber maintained at 180° C. and heated (burnt-in) for 30 minutes.

Evaluation of Glossiness

In order to evaluate glossiness, the 60-degree gloss level of each of the coating films is measured using a glossmeter "micro-TRI-Gloss" produced by Gardner.

Evaluation of Texture

The texture of each of the coating films is determined by pressing the ball of the finger against the coating film and moving the finger up and down. The evaluation is made in accordance with the following criteria.

A: Smooth surface
B: Slightly granular surface
C: Clearly granular surface
D: Sandpaper-like surface Evaluation of Strength The strength of each of the coating films is evaluated by the cupping resistance test described in JIS K 5600-5-2 (1999) in accordance with the following criteria.

Passed ("OK" in Table 1): cracking does not occur when the cupping diameter is 7 mm or more Failed ("NG" in Table 1): cracking occurs when the cupping diameter is 7 mm or more Evaluation of Surface Roughness The roughness of the surface of each of the coating films is evaluated in the following manner. The arithmetic average of the roughness profile (hereinafter, referred to as "Ra") of the surface of the coating film is measured with a surface roughness gage "SURFCOM 1400A" produced by Tokyo Seimitsu Co., Ltd. The larger the value Ra, the smaller the degree of smoothness of the surface of the coating film.

The evaluation is made in accordance of the following criteria.

A: Ra is 0.4 μm or less
B: Ra is more than 0.4 μm and 0.5 μm or less
C: Ra is more than 0.5 μm Table 1 summarizes the results of the above evaluations.

TABLE 1

| | Powder particles Type | Type | D50 (nm) | Surface-treating agent Type | C content (mass %) | C content/ D50 | Part | Coverage % | 60° gloss | Texture | Strength | Surface roughness |
|---|---|---|---|---|---|---|---|---|---|---|---|---|
| Example1A | PC1 | RX200 | 12 | TMS | 2.25 | 0.19 | 0.6 | 60 | 94 | A | OK | A |
| Example1B | | | | | | | 1.2 | 120 | 28 | B | OK | A |

TABLE 1-continued

| | Powder particles Type | External additive Type | D50 (nm) | Surface-treating agent Type | C content (mass %) | C content/ D50 | Part | Coverage % | 60° gloss | Texture | Strength | Surface roughness |
|---|---|---|---|---|---|---|---|---|---|---|---|---|
| Comparative example1A | PC1 | RX50 | 40 | TMS | 0.625 | 0.016 | 1.2 | 36 | 89 | C | OK | A |
| Comparative example1B | | | | | | | 2.0 | 60 | 66 | C | NG | B |
| Comparative example2A | PC1 | OX50 | 40 | No treatment | 0 | — | 1.2 | 36 | 84 | C | OK | C |
| Comparative example2B | | | | | | | 2.0 | 60 | 89 | C | OK | C |
| Comparative example3A | PC1 | R972 | 16 | DMS | 0.9 | 0.056 | 1.2 | 96 | 90 | C | OK | A |
| Comparative example3B | | | | | | | 2.0 | 160 | 85 | C | NG | B |
| Comparative example4A | PC1 | NAX50 | 30 | TMS | 0.65 | 0.02 | 1.2 | 51 | 88 | C | OK | A |
| Comparative example4B | | | | | | | 2.0 | 87 | 40 | C | NG | B |
| Example2A | PC1 | NY50 | 30 | PDMS | 3.0 | 0.10 | 1.2 | 51 | 83 | B | OK | A |
| Example2B | | | | | | | 2.0 | 87 | 10 | B | OK | B |
| Example3A | PC2 | RX200 | 12 | TMS | 2.25 | 0.19 | 0.6 | 57 | 90 | A | OK | A |
| Example3B | PC2 | RX200 | 12 | TMS | 2.25 | 0.19 | 1.2 | 114 | 31 | B | OK | A |
| Example4A | PC3 | RX200 | 12 | TMS | 2.25 | 0.19 | 0.6 | 55 | 87 | A | OK | A |
| Example4B | PC3 | RX200 | 12 | TMS | 2.25 | 0.19 | 1.2 | 110 | 34 | B | OK | A |
| Comparative example5 | Powder particles including 2.0 mass % matting agent "OK520" used as internal additive | | | | | | | | 55 | C | NG | C |

The above results confirm that the 60°-gloss levels of the coating films prepared in Examples are markedly reduced by amounts appropriate to the amounts of external additives deposited on the surfaces of the powder particles compared with the coating films prepared in Comparative examples. In other words, the gloss levels of the coating films prepared in Examples are markedly reduced. That is, it is confirmed that, in Examples, the matt levels of the coating films can be readily controlled.

It is also confirmed that, although having a low gloss level, the coating films prepared in Examples have a smooth texture and a quality and beautiful appearance compared with the coating film prepared in Comparative example 5, which is a coating film formed using a powder coating material that includes a matting agent used as an internal additive.

The meanings of the abbreviations and the like used in Table 1 are as follows.

Types of External Additives
RX200: Silica particles "RX200" produced by Nippon Aerosil Co., Ltd.
RX50: Silica particles "RX50" produced by Shin-Etsu Chemical Co., Ltd.
OX50: Silica particles "OX50" produced by Nippon Aerosil Co., Ltd.
R972: Silica particles "R972" produced by Nippon Aerosil Co., Ltd.
NAX50: Silica particles "NAX50" produced by Nippon Aerosil Co., Ltd.
NY50: Silica particles "NY50" produced by Nippon Aerosil Co., Ltd.
Surface-Treating Agents
TMS: Tetramethylsilane
DMS: Dimethoxymethylsilane
PDMS: Polydimethylsiloxane (dimethylsilicone oil)
Other Abbreviations
OK520: Matting material "ACEMATT OK 520" produced by Nippon Aerosil Co., Ltd.
D50: Average primary particle diameter
C content: Carbon content
Coverage: Coverage at which the powder particles are coated with the external additive The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A powder coating material comprising:
    powder particles; and
    an external additive including inorganic particles having an average primary particle diameter of 1000 nm or less, a ratio of the carbon content (mass %) in the inorganic particles to the average primary particle diameter (nm) of the inorganic particles being 0.1 or more,
    wherein the powder coating material includes a black colorant or a white colorant or does not include any colorant,
    wherein the powder particles include a thermosetting resin and a thermosetting agent.

2. The powder coating material according to claim 1, wherein the inorganic particles are inorganic oxide particles.

3. The powder coating material according to claim 2, wherein the inorganic oxide particles are at least one selected from the group consisting of silicon oxide particles, titanium oxide particles, and zinc oxide particles.

4. The powder coating material according to claim 1, wherein surfaces of the inorganic particles are treated with a surface-treating agent.

5. The powder coating material according to claim 4, wherein the surface-treating agent includes at least one selected from a silane coupling agent, a titanate coupling agent, and a silicone oil.

6. The powder coating material according to claim 4, wherein the amount of the surface-treating agent is 0.1% by mass or more and 8.0% by mass or less of the amount of the inorganic particles.

7. The powder coating material according to claim 1, wherein the ratio of the carbon content (mass %) in the inorganic particles to the average primary particle diameter (nm) of the inorganic particles is 0.1 or more and 8.0 or less.

8. The powder coating material according to claim 1, wherein the average primary particle diameter of the inorganic particles is 10 nm or more and 100 nm or less.

9. The powder coating material according to claim 1, wherein surfaces of the powder particles are covered with the inorganic particles at a coverage of 20% or more and 120% or less.

10. The powder coating material according to claim 1, wherein the powder particles have a volume-average diameter of 1 μm or more and 40 μm or less.

11. The powder coating material according to claim 1, wherein the thermosetting resin is a thermosetting polyester resin, and wherein the total of an acid value of the thermosetting polyester resin and a hydroxyl value of the thermosetting polyester resin is 10 mgKOH/g or more and 250 mgKOH/g or less.

12. The powder coating material according to claim 1, wherein the thermosetting resin is a thermosetting (meth) acrylic resin having a number-average molecular weight of 1,000 or more and 20,000 or less.

13. The powder coating material according to claim 1, wherein the amount of the thermosetting resin is 20% by mass or more and 99% by mass or less of the total amount of the powder particles.

14. The powder coating material according to claim 1, wherein the black colorant includes at least one selected from carbon black, copper oxide, manganese dioxide, aniline black, active carbon, non-magnetic ferrite, and magnetite.

15. The powder coating material according to claim 1, wherein the white colorant includes at least one selected from titanium oxide, barium sulfate, zinc oxide, and calcium carbonate.

16. The powder coating material according to claim 1, the powder coating material further comprising a metal that has a valence of two or more.

17. A powder coating material comprising:
powder particles; and
an external additive including inorganic particles having an average primary particle diameter of 1000 nm or less, a ratio of the carbon content (mass %) in the inorganic particles to the average primary particle diameter (nm) of the inorganic particles being 0.1 or more,
wherein the powder coating material includes a black colorant or a white colorant or does not include any colorant,
the powder coating material further comprising a metal that has a valence of two or more,
wherein the amount of the metal that has a valence of two or more is 0.002% by mass or more and 0.2% by mass or less of the total amount of the powder particles.

18. The powder coating material according to claim 1, wherein the powder particles have an average circularity of 0.97 or more.

19. An item coated with the powder coating material according to claim 1.

* * * * *